(12) United States Patent
Kim et al.

(10) Patent No.: US 9,047,827 B2
(45) Date of Patent: Jun. 2, 2015

(54) DISPLAY APPARATUS

(75) Inventors: Ji-Sun Kim, Seoul (KR); Jai-Hyun Koh, Seoul (KR); Yeong-Keun Kwon, Yongin-si (KR); Heendol Kim, Yongin-si (KR); Kuk-Hwan Ahn, Hwaseong-si (KR); Bonghyun You, Yongin-si (KR); Chongchul Chai, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 204 days.

(21) Appl. No.: 13/523,135

(22) Filed: Jun. 14, 2012

(65) Prior Publication Data

US 2013/0050282 A1    Feb. 28, 2013

(30) Foreign Application Priority Data

Aug. 31, 2011 (KR) .......................... 10-2011-0087890

(51) Int. Cl.
    *G09G 3/36*       (2006.01)
    *G09G 3/34*       (2006.01)
    *G09G 3/20*       (2006.01)
    *G02F 1/1335*    (2006.01)

(52) U.S. Cl.
CPC ............ *G09G 3/3413* (2013.01); *G09G 3/3648* (2013.01); *G09G 3/2003* (2013.01); *G09G 3/3614* (2013.01); *G02F 1/133621* (2013.01); *G02F 1/133514* (2013.01); *G09G 3/3607* (2013.01); *G09G 3/3426* (2013.01); *G09G 2300/0452* (2013.01); *G09G 2310/0235* (2013.01); *G09G 2320/0247* (2013.01)

(58) Field of Classification Search
CPC ................... G09G 2300/0452; G09G 3/3413; G09G 3/3607; G09G 3/3614; G02F 1/133514; G02F 2201/52
See application file for complete search history.

(56) References Cited

U.S. PATENT DOCUMENTS

| 2009/0040243 | A1* | 2/2009 | Hisada et al. ................. 345/690 |
| 2009/0174638 | A1* | 7/2009 | Brown Elliott et al. ........ 345/88 |
| 2010/0091030 | A1* | 4/2010 | Park et al. ..................... 345/589 |

FOREIGN PATENT DOCUMENTS

| EP | 2148300 A1 * | 1/2010 |
| WO | WO 2005101807 A2 * | 10/2005 |

\* cited by examiner

*Primary Examiner* — Quan-Zhen Wang
*Assistant Examiner* — Xuemei Zheng
(74) *Attorney, Agent, or Firm* — F. Chau & Associates, LLC.

(57) ABSTRACT

A display apparatus includes a backlight assembly, a driving circuit part, and a display panel. The backlight assembly emits light. The driving circuit part receives an image signal, converts the image signal into image data, and generates a driving signal based on the image data. The display panel includes at least one pixel in which a plurality of sub-pixels is arranged in a two row by four column array, wherein the panel receives the light to display an image in response to the driving signal, wherein two sub-pixels of the sub-pixels arranged in a first row of the array each comprise a white color filter and two sub-pixels of the sub-pixels arranged in a second row of the array each comprise a white color filter.

11 Claims, 10 Drawing Sheets

Fig. 10C

DISPLAY APPARATUS

CROSS-REFERENCE TO RELATED APPLICATION

This application claims priority to Korean Patent Application No. 10-2011-0087890 filed on Aug. 31, 2011, the disclosure of which is incorporated by reference herein in its entirety.

BACKGROUND

1. Technical Field

The present invention relates to a display apparatus. More particularly, the present invention relates to a display apparatus with improved display quality.

2. Discussion of the Related Art

In general, a display apparatus includes a display panel through which images are viewed. The display panel may include a matrix of pixels each including three sub-pixels. The three sub-pixels may include a red color filter, a green color filter, and a blue color filter that form a corresponding color when brightened. Each sub-pixel is driven by a transistor. The display apparatus controls the brightness in each sub-pixel according to a charge stored in a capacitor in each sub-pixel which controls driving of the transistor.

In an effort to improve color reproducibility, that is, how closely the color on the display panel matches the color of the real thing; different types of pixel structures have been suggested. However, when using sub-pixel configurations having colors different from the red, green, and blue sub-pixels, the brightness of a pixel may be deteriorated.

Accordingly, there is a need for a display apparatus with improved display quality.

SUMMARY

An exemplary embodiment of the present invention provides a display apparatus with improved brightness and color reproducibility.

An exemplary embodiment of the present invention provides a display apparatus with reduced flicker and cross-talk.

According to an exemplary embodiment of the present invention, a display apparatus includes a backlight assembly emitting light, a driving circuit part receiving an image signal, converting the image signal into image data, and generating a driving signal based on the image data, and a display panel including at least one pixel in which a plurality of sub-pixels is arranged in a two row by four column array, wherein the display panel receives the light to display an image in response to the driving signal. Two sub-pixels of the sub-pixels arranged in a first row of the array each include a white color filter and two sub-pixels of the sub-pixels arranged in a second row of the array each include a white color filter.

Four sub-pixels arranged in first and second columns of the array are a first sub-pixel group, four sub-pixels arranged in third and fourth columns of the array are a second sub-pixel group, two sub-pixels of the first sub-pixel group each comprise one of the white color filters, one of the remaining two sub-pixels of the first sub-pixel group comprises a color filter having a first color, the other one of the remaining two sub-pixels of the first sub-pixel group comprises a color filter having a second color different from the first color, two sub-pixels of the second sub-pixel group each comprise one the white color filters, one of the remaining two sub-pixels of the second sub-pixel group comprises a color filter having a third color different from the first and second colors, and the other one of the remaining two sub-pixels of the second sub-pixel group comprises a color filter having a fourth color different from the first, second, and third colors.

The two sub-pixels including the white color filters of the first sub-pixel group are arranged in different columns from each other, and the two sub-pixels including the white color filters of the second sub-pixel group are arranged in different columns from each other.

The remaining two sub-pixels of the first sub-pixel group are arranged in different columns from each other, and the remaining two sub-pixels of the second sub-pixel group are arranged in different columns from each other.

Among the first sub-pixel group, the sub-pixel arranged in the first row and the first column is a first sub-pixel, the sub-pixel arranged in the first row and the second column is a second sub-pixel, the sub-pixel arranged in the second row and the first column is a third sub-pixel, and the sub-pixel arranged in the second row and the second column is a fourth sub-pixel, and among the second sub-pixel group, the sub-pixel arranged in the first row and the third column is a fifth sub-pixel, the sub-pixel arranged in the first row and the fourth column is a sixth sub-pixel, the sub-pixel arranged in the second row and the third column is a seventh sub-pixel, and the sub-pixel arranged in the second row and the fourth column is an eighth sub-pixel, and each of the second, third, sixth, and seventh sub-pixels comprises one of the white color filters.

The pixel is provided in a plural number and the pixels are arranged in an N row by M column array, wherein each of N and M is a natural number equal to or larger than 2.

The pixels arranged in a K-th column among the pixels arranged in the N row by M column array have the same color filter arrangement, where K is a natural number equal to or smaller than M.

The pixels arranged in a K-th column among the pixels arranged in the N row by M column array have the same color filter arrangement, where K is a natural number equal to or smaller than M.

The two sub-pixels including the white color filters of the first sub-pixel group are arranged in the same column and the two sub-pixels including the white color filters of the second sub-pixel group are arranged in the same column.

Each of the sub-pixels further includes a pixel electrode and the driving signal includes data voltages to be applied to the pixel electrodes. The two sub-pixels, each including the white color filter, of the sub-pixels arranged in the first row are applied with the data voltages having polarities opposite to each other, and the two sub-pixels, each including the white color filter, of the sub-pixels arranged in the second row are applied with the data voltages having polarities opposite to each other.

The backlight assembly includes at least one light source and a light source controller. The light source includes a first light emitting device emitting a red light, a second light emitting device emitting a green light, and a third light emitting device emitting a blue light, and the light source controller receives the image data and drives the first, second, and third light emitting devices in a time division manner according to brightness characteristics and color characteristics of the image data.

The light source further comprises a fourth light emitting device emitting light having a color different from the red, green and blue lights of the first, second, and third light emitting devices, and the fourth light emitting device is driven in synchronization with at least one of the first, second, and third light emitting devices.

According to an exemplary embodiment of the present invention, a display apparatus includes a backlight assembly emitting light, a driving circuit part receiving an image signal, converting the image signal into image data, and generating a driving signal based on the image data, and a display panel including at least one pixel in which a plurality of sub-pixels is arranged in a two row by three column array, wherein the display panel receives the light to display an image in response to the driving signal. Two sub-pixels of the sub-pixels each include a white color filter and four sub-pixels of the sub-pixels include color filters having different colors from each other.

The pixel is provided in a plural number on the display panel, the pixels are arranged in an N row by M column array, wherein each of N and M is a natural number equal to or larger than 2, and wherein the pixels arranged in a K-th column of the pixels arranged in the N row by M column array comprise the same color filter arrangement, and K is a natural number equal to or smaller than M.

The pixels arranged in a (K−1)th column of the pixels arranged in the N row by M column array comprise the same color filter arrangement.

The two sub-pixels each including the white color filter are arranged in a second column of the two row by three column array in each of the pixels arranged in the K-th column and the (K−1)th column.

The color filters arranged in a first row of the two row by three column array of each of the pixels arranged in the (K−1)th column are arranged in the same manner as the color filters arranged in a second row of the two row by three column array of each of the pixels arranged in the K-th column, and the color filters arranged in the second row of the two row by three column array of each of the pixels arranged in the (K−1)th column are arranged in the same manner as the color filters arranged in the first row of the two row by three column array of each of the pixels arranged in the K-th column.

One of the two sub-pixels including the white color filter of each of the pixels arranged in the K-th column is arranged in a first row and a first column of the two row by three column array, and the remaining one of the two sub-pixels including the white color filter of each of the pixels arranged in the K-th column is arranged in the first row and a third column of the two row by three column array.

One of the two sub-pixels including the white color filter of each of the pixels arranged in the K-th column is arranged in a first row and a first column of the two row by three column array, and the remaining one of the two sub-pixels including the white color filter of each of the pixels arranged in the K-th column is arranged in a second row and a third column of the two row by three column array.

The color filters arranged in the first row and a second column and in the first row and the third column of the two row by three column array of each of the pixels arranged in the (K−1)th column are the same as the color filters arranged in the second row and the first column and in the second row and the second column of the two row by three column array of each of the pixels arranged in the K-th column, and the color filters arranged in the second row and the first column and in the second row and the second column of the two row by three column array of each of the pixels arranged in the (K−1)th column are the same as the color filters arranged in the first row and the second column and in the first row and the third column of the two row by three column array of each of the pixels arranged in the K-th column.

According to an exemplary embodiment of the present invention, a display apparatus includes a driving circuit part receiving an image signal, converting the image signal into image data, and generating a driving signal based on the image data; and a display panel including at least one pixel in which a plurality of sub-pixels is arranged in an array, wherein the display panel displays an image in response to the driving signal, wherein at least two of the sub-pixels each comprise a white color filter and four of the sub-pixels comprise non-white color filters having different colors from each other.

BRIEF DESCRIPTION OF THE DRAWINGS

The above and features of the present invention will become more apparent by describing in detail exemplary embodiments thereof with reference to the accompanying drawings in which.

DETAILED DESCRIPTION OF EXEMPLARY EMBODIMENTS

Exemplary embodiments of the present invention will be described more fully hereinafter with reference to the accompanying drawings. However, the present invention may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout the specification and drawings.

Figure 1:
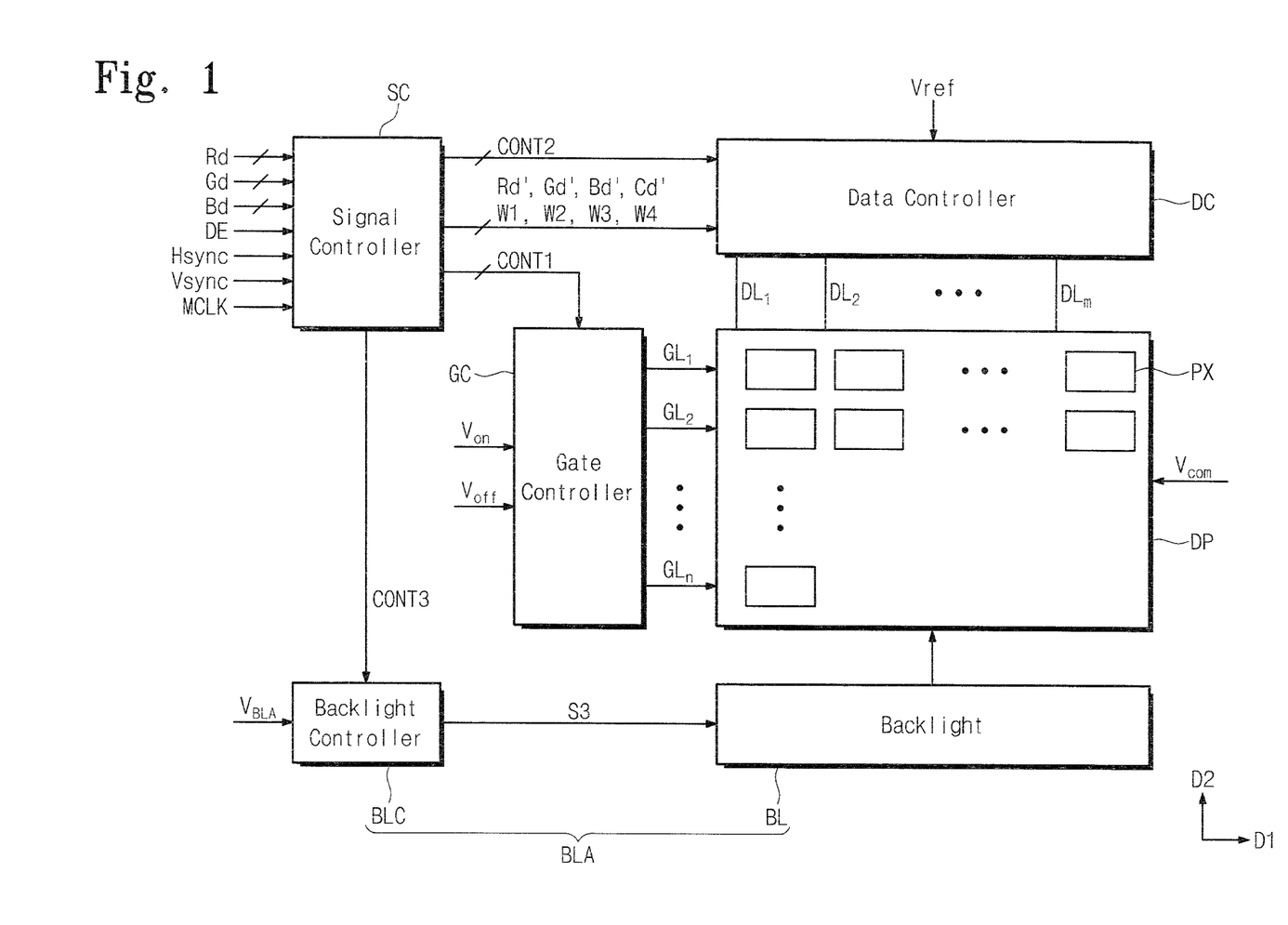
FIG. 1 is a block diagram showing a display apparatus according to an exemplary embodiment of the present invention.
Figure 2:
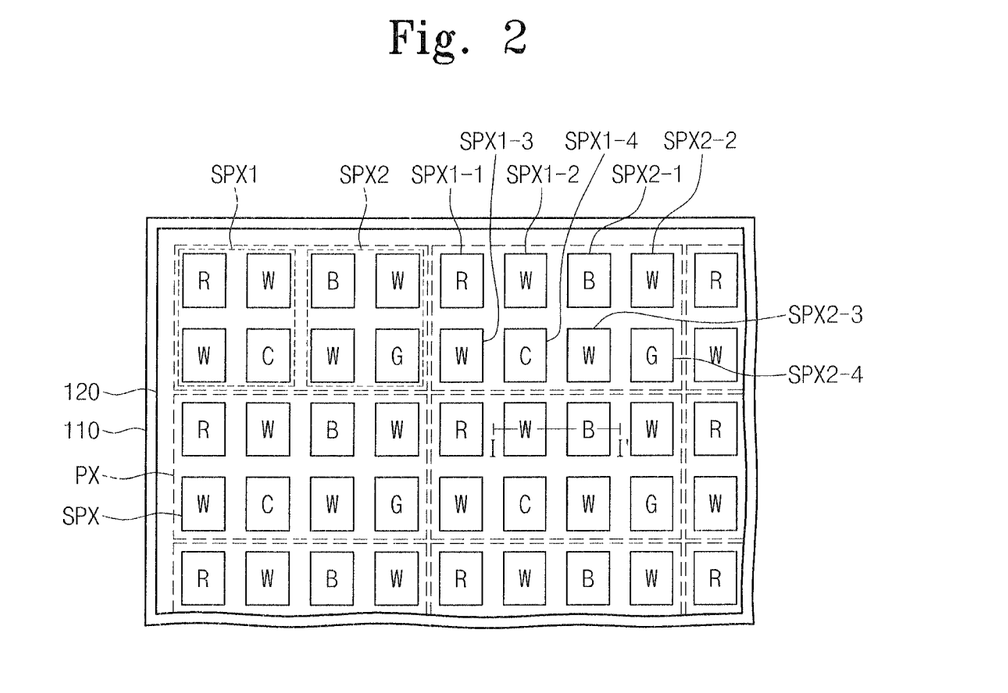
FIG. 2 is a plan view showing a display panel shown in FIG. 1, according to an exemplary embodiment of the present invention.
Figure 3:
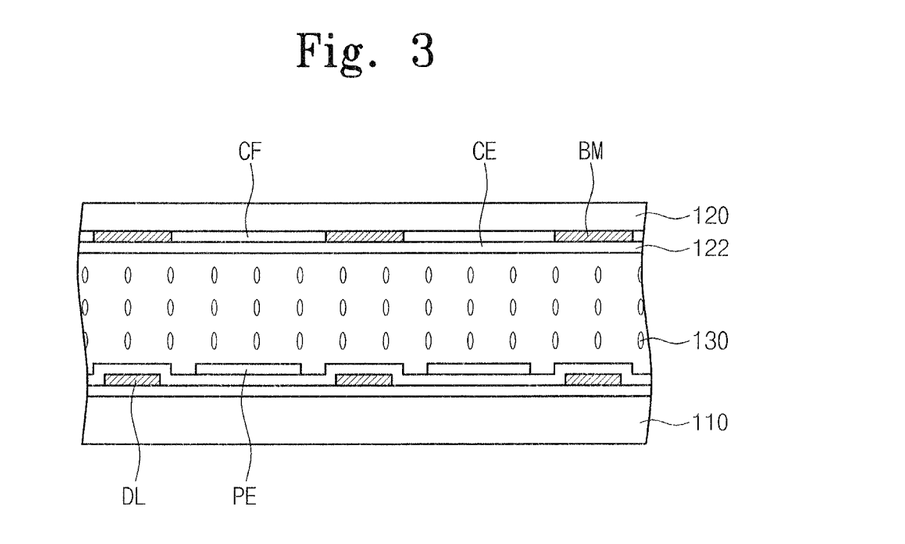
FIG. 3 is a cross-sectional view taken along line I-I' shown in FIG. 2.
Figure 4:
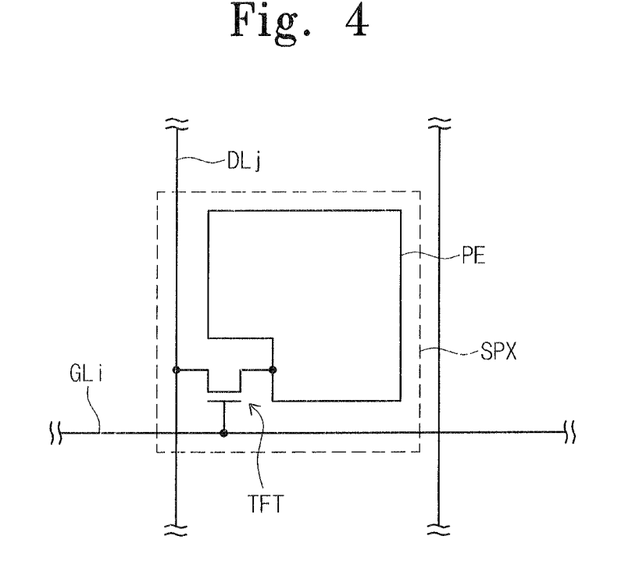
FIG. 4 is a circuit diagram showing a sub-pixel shown in FIG. 2, according to an exemplary embodiment of the present invention.

FIG. 1 is a block diagram showing a display apparatus according to an exemplary embodiment of the present invention, FIG. 2 is a plan view showing a display panel shown in FIG. 1, according to an exemplary embodiment of the present invention, FIG. 3 is a cross-sectional view taken along line I-I' shown in FIG. 2, and FIG. 4 is a circuit diagram showing a sub-pixel shown in FIG. 2, according to an exemplary embodiment of the present invention.

Referring to FIG. 1, a display apparatus includes a display panel DP, a driving circuit part, and a backlight assembly BLA.

In the present exemplary embodiment, the display panel DP may be a liquid crystal display employing a liquid crystal layer as a transmission type display panel. The display panel DP may also be various other types such as an organic light emitting diode display panel, a plasma display panel, etc.

The driving circuit part includes a signal controller SC, a data driver (hereinafter, referred to as the data controller) DC, and a gate driver (hereinafter, referred to as the gate controller) GC. The backlight assembly BLA includes a backlight BL for emitting light and acting as a light source for the display panel DP and a backlight controller BLC for controlling the backlight BL.

As shown in FIGS. 1 to 4, especially FIG. 3, the display panel DP includes a first substrate 110, a second substrate 120 facing the first substrate 110 and spaced apart from the first substrate 110, and a liquid crystal layer 130 interposed between the first substrate 110 and the second substrate 120.

The first substrate 110 includes a plurality of first lines GL1 to GLn extended in a first direction D1 and a plurality of second lines DL1 to DLm extended in a second direction D2 crossing the first direction D1. The second lines DL1 to DLm are insulated from the first lines GL1 to GLn. Hereinafter, the first lines GL1 to GLn will be referred to as gate lines and the second lines DL1 to DLm will be referred to as data lines.

In addition, a plurality of thin film transistors is disposed on the first substrate 110. Each of the thin film transistors is connected to a corresponding gate line of the gate lines GL1 to GLn and a corresponding data line of the data lines DL1 to DLm.

The display panel DP includes at least one pixel PX. When the pixel PX is provided on the display panel DP in a plural number, the pixels PX may be arranged in a matrix form of N rows by M columns. In this case, each of N and M is a natural number equal to or larger than 2.

Each pixel PX includes eight sub-pixels SPX arranged in two rows by four columns. For example, a two row by four column array. Each of the sub-pixels SPX includes a pixel electrode PE and a color filter CF.

The pixel electrodes PE are disposed on the first substrate 110. Each of the pixel electrodes PE is connected to a corresponding thin film transistor TFT of the thin film transistors.

Hereinafter, one sub-pixel SPX will be described in detail with reference to FIG. 4. Referring to FIG. 4, the thin film transistor TFT includes a gate electrode connected to a gate line GL1, a source electrode connected to a data line DLj, and a drain electrode connected to the pixel electrode PE. When a voltage is applied to the gate electrode through the gate line GL1, the thin film transistor TFT is turned on. Accordingly, a data voltage applied to the source electrode through the data line DLj is charged in the pixel electrode PE through the turned-on thin film transistor TFT as a pixel voltage.

As shown in FIG. 3, the color filter CF may be disposed on the second substrate 120. The color filters CF included in the sub-pixels SPX are disposed corresponding to the pixel electrodes PE, respectively. The color filters CF may have the same area as the pixel electrodes PE and face the pixel electrodes PE.

In addition, the display panel DP includes a common electrode 122 (also identified hereinafter as CE) to form an electric field in cooperation with the pixel electrodes PE. As an example, the common electrode 122 is disposed on the second substrate 120 to cover the color filters CF.

In addition, the color filters CF are spaced apart from each other and a black matrix BM is disposed between the color filters CF to prevent light from being mixed between adjacent color filters CF. The black matrix BM may be disposed on the second substrate 120.

In the present exemplary embodiment, the common electrode CE and the color filters CF are disposed on the second substrate 120, but they should not be limited thereto or thereby. For example, the common electrode CE and the color filters CF may be disposed on the first substrate 110.

Referring to FIG. 2, the pixel PX includes eight sub-pixels including four sub-pixels each having a color filter CF of a white color W (hereinafter, referred to as the white color filter) and four sub-pixels respectively having different color filters R (hereinafter, referred to as the red color filter), G (hereinafter, referred to as the green color filter), B (hereinafter, referred to as the blue color filter), and C (hereinafter, referred to as the cyan color filter).

Two sub-pixels SPX arranged in the first row of the two row by four column array each include the white color filter CF and two sub-pixels SPX arranged in the second row of the two row by four column array each include the white color filter CF.

Of the sub-pixels SPX, four sub-pixels arranged in the first and second columns of the array are referred to as a first sub-pixel group SPX1 and four sub-pixels arranged in the third and fourth columns of the array are referred to as a second sub-pixel group SPX2.

Among the first sub-pixel group SPX1, the sub-pixel arranged in the first row and the first column is referred to as a first sub-pixel SPX1-1, the sub-pixel arranged in the first row and the second column is referred to as a second sub-pixel SPX1-2, the sub-pixel arranged in the second row and the first column is referred to as a third sub-pixel SPX1-3, and the sub-pixel arranged in the second row and the second column is referred to as a fourth sub-pixel SPX1-4.

Among the second sub-pixel group SPX2, the sub-pixel arranged in the first row and the third column is referred to as a fifth sub-pixel SPX2-1, the sub-pixel arranged in the first row and the fourth column is referred to as a sixth sub-pixel SPX2-2, the sub-pixel arranged in the second row and the third column is referred to as a seventh sub-pixel SPX2-3, and the sub-pixel arranged in the second row and the fourth column is referred to as an eighth sub-pixel SPX2-4.

Each of two sub-pixels in the first sub-pixel group SPX1 includes the white color filter CF, one of the remaining two sub-pixels in the first sub-pixel group SPX1 includes a first color filter CF, and the other of the remaining two sub-pixels in the first sub-pixel group SPX1 includes a second color filter CF.

Each of two sub-pixels in the second sub-pixel group SPX2 includes the white color filter CF, one of the remaining two sub-pixels in the second sub-pixel group SPX2 includes a third color filter CF, and the other of the remaining two sub-pixels in the second sub-pixel group SPX2 includes a fourth color filter CF.

In the present exemplary embodiment, the first, second, third, and fourth color filters CF are different from each other. For instance, the first color filter CF is the red color filter R, the second color filter CF is the cyan color filter C, the third color filter CF is the blue color filter B, and the fourth color filter CF is the green color filter G. The second color filter CF may be replaced with different color filters, such as a yellow color filter, a purple color Filter, etc., however the red, blue, and green color filters R, B, and G are included in the first to fourth color filters CF.

Thus, the display apparatus including the pixel PX with the color filters CF of four colors may have improved color reproducibility.

In detail, each of the second sub-pixel SPX1-2, the third sub-pixel SPX1-3, the sixth sub-pixel SPX2-2, and the seventh sub-pixel SPX2-3 includes the white color filter CF.

The first sub-pixel SPX1-1, the fourth sub-pixel SPX1-4, the fifth sub-pixel SPX2-1, and the eighth sub-pixel SPX2-4 include the red color filter R, the cyan color filter C, the blue color filter B, and the green color filter G, respectively.

In addition, the pixels PX shown in FIG. 2 have the same arrangement, but they should not be limited thereto or thereby. In other words, the arrangement of the pixels PX may be changed as shown in FIGS. 9A to 9G.

Referring to FIG. 1 again, the signal controller SC receives image signals Rd, Gd, and Bd and control signals, such as a vertical synchronizing signal Vsync, a horizontal synchronizing signal Hsync, a main clock signal MCLK, a data enable signal DE, etc., from an external graphics controller (not shown). The signal controller SC processes the image signals Rd, Gd, and Bd and the control signals to be appropriate for the display panel DP and generates a gate control signal CONT1, a data control signal CONT2, and a backlight control signal CONT3.

The image signals include a red image signal Rd, a green image signal Gd, and a blue image signal Bd. Each of the red image signal Rd, the green image signal Gd, and the blue image signal Bd includes brightness information and color information. The red image signal Rd, the green image signal Gd, and the blue image signal Bd include red, green, and blue color information, respectively.

The signal controller SC generates image data Rd', Gd', Bd', Cd', W1, W2, W3, and W4 based on the red, green, and blue image signals Rd, Gd, and Bd. The image data includes red image data Rd', green image data Gd', blue image data Bd', fourth color image data Cd', and four white color image data W1, W2, W3, and W4.

The red image data Rd', the green image data Gd', the blue image data Bd' respectively include the brightness information and the color information of the red image signal Rd, the green image signal Gd, and the blue image signal Bd.

The fourth color image data Cd' is generated based on two of the red image signal Rd, the green image signal Gd, and the blue image signal Bd. For instance, when the fourth color image data Cd' is cyan image data, the cyan image data includes color information of a cyan color obtained by mixing the color information of the blue image signal Bd and the color information of the green image signal Gd. In addition, when the fourth image data Cd' is the cyan image data it includes brightness information which is smaller than the brightness information of the green and blue image signals Gd and Bd.

The four white image data W1, W2, W3, and W4 include color information of a white color. In addition, the four white image data W1, W2, W3, and W4 include brightness information equal to the smallest brightness level among the brightness information of the red image signal Rd, the green image signal Gd, and the blue image signal Bd.

The signal controller SC provides the red, green, and blue image data. Rd', Gd', Bd', the fourth color image data Cd', and the four white image data W1, W2, W3, and W4 generated based on the red, green, and blue image signals Rd, Gd, and Bd to the data driver DC.

The gate control signal CONT1 is applied to the gate driver GC. The gate control signal CONT1 includes various signals, such as a vertical synchronizing start signal STV indicating an output start of a gate-on pulse, e.g., a high period of a gate signal, a gate clock signal CPV controlling an output timing of the gate-on pulse, an output enable signal OE controlling a width of the gate-on pulse, etc.

The data control signal CONT2 is applied to the data driver DC. The data control signal CONT2 includes a horizontal synchronizing start signal STH indicating an input start of the red, green, and blue image data Rd', Gd', and Bd', a load signal TP indicating an application of data voltages to the data lines DL1 to DLm, an inversion signal RSV inverting the polarity of the data voltages with respect to a common voltage Vcom, and a data clock signal HCLK.

The backlight control signal CONT3 is applied to the backlight controller BLC. The backlight control signal CONT3 may include the red, green, and blue image signals Rd, Gd, and Bd or the image data Rd', Gd', Bd', Cd', W1, W2, W3, and W4. The gate driver GC sequentially applies analog signals in response to a gate-on voltage Von and a gate-off voltage Voff to the gate lines GL1 to GLn as gate signals. The gate driver GC may include a plurality of stages with shift registers.

The data driver DC is connected to the data lines DL1 to DLm of the display panel DP. The data driver DC receives the image data Rd', Gd', Bd', Cd', W1, W2, W3, and W4 and applies the data voltages to the data lines DL1 to DLm in response to a reference voltage Vref.

Figure 5:
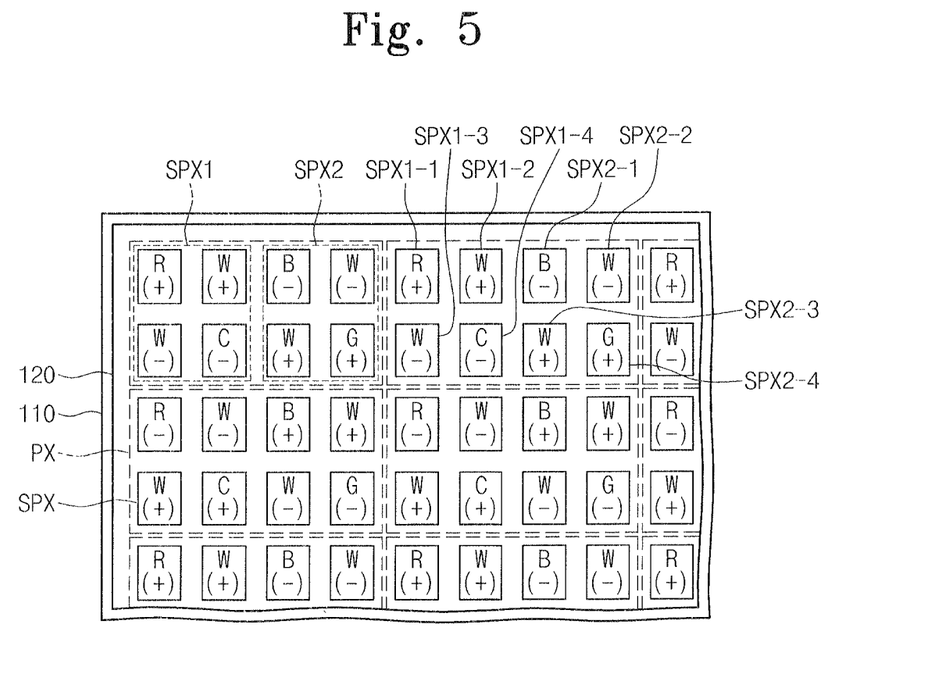
FIG. 5 is a plan view showing polarities of data voltages applied to sub-pixels shown in FIG. 2, according to an exemplary embodiment of the present invention.

FIG. 5 is a plan view showing polarities of data voltages applied to the sub-pixels SPX shown in FIG. 2, according to an exemplary embodiment of the present invention.

The data driver DC may apply the data voltages having the polarities as shown in FIG. 5 to the sub-pixels SPX. In more detail, when the data driver DC applies the data voltages having the polarities as shown in FIG. 5 to the data lines DL1 to DLm, the data voltages applied to the data lines DL1 to DLm are applied to the sub-pixels SPX through the thin film transistors and charged in the sub-pixels SPX.

In this case, the two sub-pixels SPX including the white color filter CF among the sub-pixels SPX arranged in the first row of the array are applied with the data voltages having polarities opposite to each other. In other words, when one of the two sub-pixels SPX including the white color filter CF is applied with a positive (+) data voltage, the other one of the two sub-pixels SPX including the white color filter CF is applied with a negative (−) data voltage.

Similar to the above-mentioned example, the two sub-pixels SPX including the white color filter CF among the sub-pixels SPX arranged in the second row of the array are applied with the data voltages having polarities opposite to each other.

Although the arrangement of the white color filters CF may be changed to be different from the above-mentioned arrangement as shown in FIG. 2, the data voltages are applied to the sub-pixels SPX including the white color filters CF in the same manner as described above with reference to FIG. 5.

The two sub-pixels SPX including the white color filters CF satisfy the electrical neutral condition in a row. Thus, a flicker phenomenon may be prevented from occurring between sub-pixels SPX adjacent to each other, thereby reducing crosstalk.

The backlight assembly BLA receives the backlight control signal CONT3 to control the amount of light and the combination of colors provided to the display panel DP.

When the backlight control signal CONT3 includes the image data Rd', Gd', Bd', Cd', W1, W2, W3, and W4, the amount of light is controlled in each area of the display panel DP according to brightness characteristics of the image data Rd', Gd', Bd', Cd', W1, W2, W3, and W4, and the combination of colors is controlled in each area of the display panel DP according to color characteristics of the image data Rd', Gd', Bd', Cd', W1, W2, W3, and W4.

Figure 6:
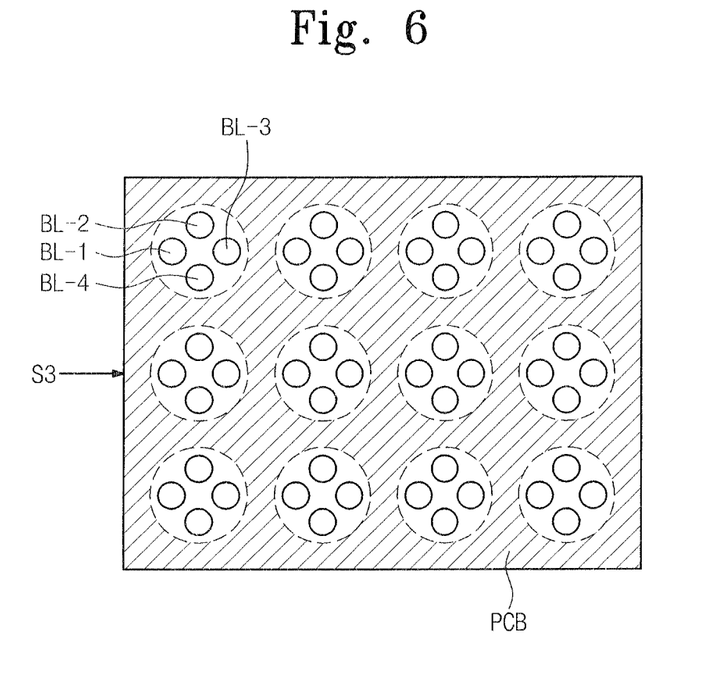
FIG. 6 is a plan view showing a backlight unit shown in FIG. 1, according to an exemplary embodiment of the present invention.
Figure 7:
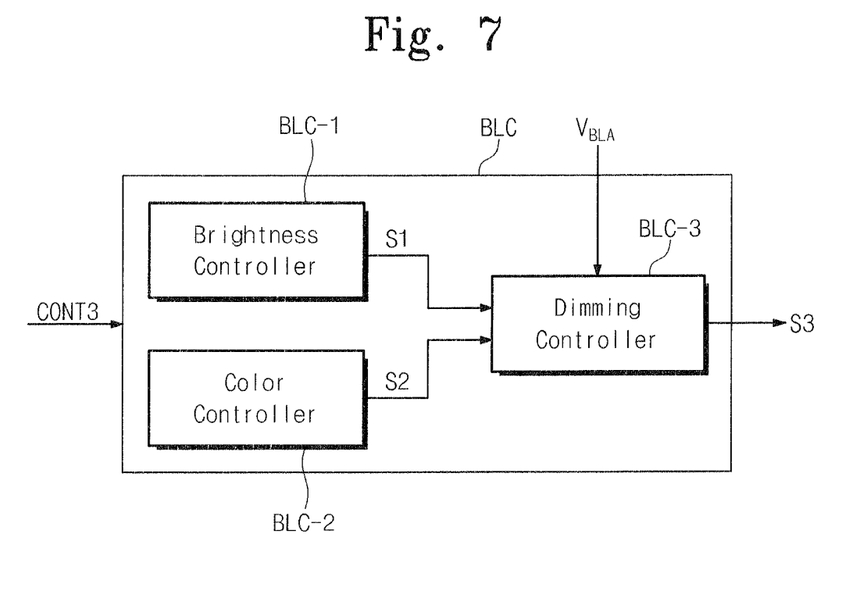
FIG. 7 is a block diagram showing a backlight controller shown in FIG. 1, according to an exemplary embodiment of the present invention.
Figure 8:
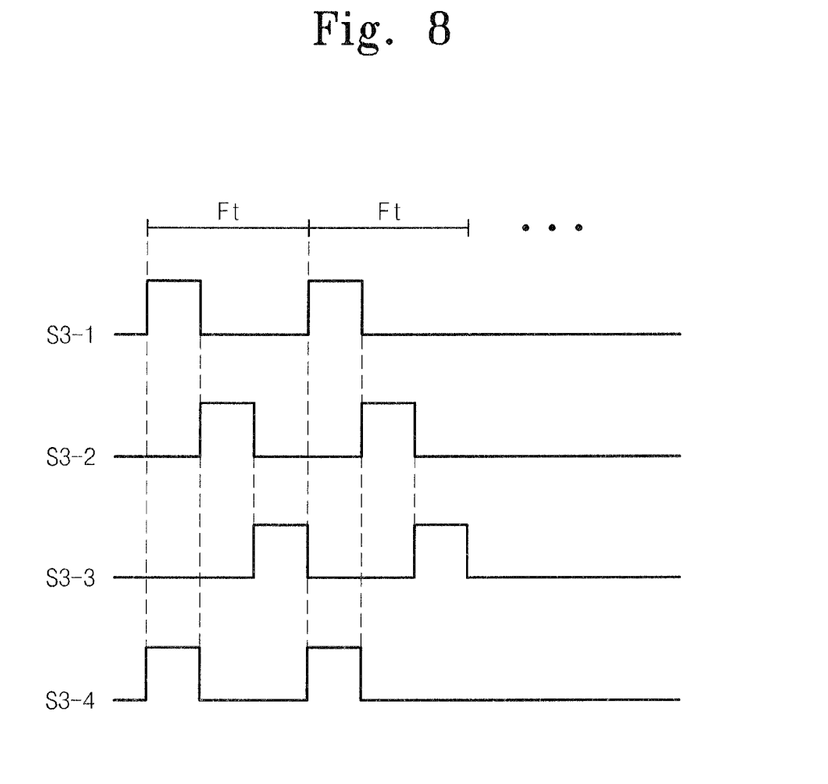
FIG. 8 is a waveform diagram showing dimming signals output from the backlight controller shown in FIG. 7, according to an exemplary embodiment of the present invention.

FIG. 6 is a plan view showing a backlight unit shown in FIG. 1, according to an exemplary embodiment of the present invention, FIG. 7 is a block diagram showing a backlight controller shown in FIG. 1, according to an exemplary embodiment of the present invention, and FIG. 8 is a waveform diagram showing dimming signals output from the backlight controller shown in FIG. 7, according to an exemplary embodiment of the present invention.

The backlight assembly BLA includes the backlight BL for emitting light and the backlight controller BLC for controlling the backlight BL. The backlight BL is disposed under the display panel DP and provides light to the display panel DP.

The backlight BL is mounted on a printed circuit board PCB. The printed circuit board PCB includes a plurality of wires (not shown) to apply signals from the outside to the backlight BL.

The backlight BL is provided on the printed circuit board PCB in a plural number to uniformly provide light to the display panel DP. The backlights BL may be substantially simultaneously controlled or independently controlled.

In addition, the backlight BL includes at least first, second, and third light emitting devices BL-1, BL-2, and BL-3. The first, second, and third light emitting devices BL-1, BL-2, and BL-3 emit three primary colors. For instance, the first, second, and third light emitting devices BL-1, BL-2, and BL-3 may employ a first light emitting diode emitting a red light, a second light emitting diode emitting a green light, and a third light emitting diode emitting a blue light, respectively.

As shown in FIG. 6, the backlight BL may further include at least one fourth light emitting device BL-4 emitting a different color light from those of the first, second, and third light emitting devices BL-1, BL-2, and BL-3. The fourth light emitting diode BL-4 may employ a light emitting diode emitting a cyan light or an emerald light.

Referring to FIG. 7, the backlight controller BLC includes a brightness controller BLC-1 and a color controller BLC-2. The brightness controller BLC-1 analyzes the brightness characteristics of the image data. Rd', Gd', Bd', Cd', W1, W2, W3, and W4 and outputs a brightness control signal S1 based on the analyzed brightness characteristics, and the color controller BLC-2 analyzes the color characteristics of the image data Rd', Gd', Bd', Cd', W1, W2, W3, and W4 and outputs a color control signal S2 based on the analyzed color characteristics. The brightness control signal S1 may be a digital signal representing the brightness level of the image data Rd', Gd', Bd', Cd', W1, W2, W3, and W4, and the color control signal S2 may be a digital signal representing the color level of the image data Rd', Gd', Bd', Cd', W1, W2, W3, and W4.

In addition, the backlight controller BLC includes a dimming controller BLC-3 receiving the brightness control signal S1 and the color control signal S2. The dimming controller BLC-3 modulates a driving voltage signal VBLA from the outside in response to the brightness control signal S1 and the color control signal S2 and outputs a dimming control signal S3 including the brightness information and the color information of the image data Rd', Gd', Bd', Cd', W1, W2, W3, and W4.

The first, second, and third light emitting devices BL-1, BL-2, and BL-3 may be independently driven by the dimming control signal S3 applied from the backlight controller BLC. In this case, the first, second, and third light emitting diodes BL-1, BL-2, and BL-3 are driven in a time division manner.

As shown in FIG. 8, the dimming control signal S3 includes a first dimming control signal S3-1 to control the first light emitting device BL-1, a second dimming control signal S3-2 to control the second light emitting device BL-2, and a third dimming control signal S3-3 to control the third light emitting device BL-3. The first, second, and third dimming control signals S3-1, S3-2, S3-3 may be sequentially applied to the first, second, and third light emitting devices BL-1, BL-2, and BL-3.

Each of the first, second, and third dimming control signals S3-1, S3-2, and S3-3 has a level depending on the brightness information and the color information of the image data Rd', Gd', Bd', Cd', W1, W2, W3, and W4. In addition, the amount of the light emitted from each of the first, second, and third light emitting devices BL-1, BL-2, and BL-3 is proportional to the level of each of the first, second, and third dimming control signals S3-1, S3-2, and S3-3.

As described above, when the first, second, and third light emitting devices BL-1, BL-2, and BL-3 include red, green, and blue light emitting diodes respectively emitting the red, green, and blue lights, the first dimming control signal S3-1 is generated based on the red image data Rd', the second dimming control signal S3-2 is generated based on the green image data Gd', and the third dimming control signal S3-3 is generated based on the blue image data Bd'.

In addition, only one of the first, second, and third light emitting devices BL-1, BL-2, and BL-3 may emit light during one frame period Ft. In this case, the sub-pixel SPX including the white color filter CF among the sub-pixels SPX displays a specific color. In other words, the display apparatus may display the specific color or the white color using the sub-pixel SPX including the white color filter.

As described above, the backlight BL may further include the fourth light emitting device BL-4. The fourth light emitting device BL-4 emits light different from those of the first, second, and third light emitting devices BL-1, BL-2, and BL-3. The fourth light emitting device BL-4 is driven in synchronization with one of the first, second, and third light emitting devices BL-1, BL-2, and BL-3.

The dimming controller BLC-3 generates a fourth dimming control signal S3-4 to control the fourth light emitting device BL-4 together with the first, second, and third dimming control signals S3-1, S3-2, and S3-3. The fourth dimming control signal S3-4 is output at the same time as one of the first, second, and third dimming control signals S3-1, S3-2, and S3-3. As shown in FIG. 8, the fourth dimming control signal S3-4 may be output at the same time as the first dimming control signal S3-1.

The fourth dimming control signal S3-4 is generated based on the fourth color image data Cd' or based on two image data among the red image data Rd', the green image data Gd', and the blue image data Bd'.

The backlight BL further including the fourth light emitting device BL-4 may provide a variety of light to the display panel DP. In other words, the display apparatus may have improved color reproducibility by using the backlight BL.

FIGS. 9A to 9G are plan views showing display apparatuses according to exemplary embodiments of the present invention.

In the display apparatuses employing the display panels DP shown in FIGS. 9A to 9G, the arrangement of the color filters CF included in the pixels PX are different from that of the display apparatus described with reference to FIGS. 1 to 8. Hereinafter, the arrangement of the color filters CF included in the pixels PX will be mainly described with reference to 9A to 9G. In addition, the same reference numerals denote the same elements in FIGS. 1 to 8, and thus detailed descriptions of the same elements will be omitted.

The display panels DP shown in FIGS. 9A to 9G include at least one pixel PX as described with reference to FIG. 2. The display panels DP may include a plurality of pixels PX arranged in the matrix form of N rows by M columns. In this case, each of N and M is a natural number equal to or larger than 2.

Each pixel PX includes eight sub-pixels SPX arranged in a two row by four column array. Each of the sub-pixels SPX includes a pixel electrode PE and a color filter CF.

In addition, two sub-pixels among the sub-pixels SPX arranged in the first row of the array each include the white color filter W, and two sub-pixels among the sub-pixels SPX arranged in the second row of the array each include the white color filter W.

In the display panels DP shown in FIGS. 9A to 9F, the two sub-pixels, each including the white color filter W of the first sub-pixel group SPX1, are arranged in different columns from each other, and the two sub-pixels, each including the white color W of the second sub-pixel group SPX2, are arranged in different columns from each other.

Figure 9A:
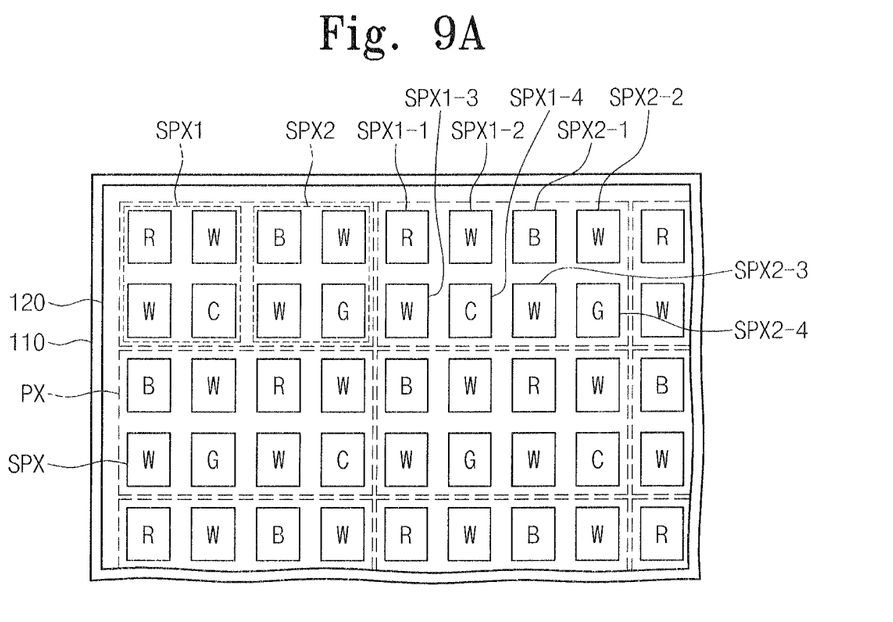
FIGS. 9A to 9G are plan views showing a display apparatus according to exemplary embodiments of the present invention.
Figure 9B:
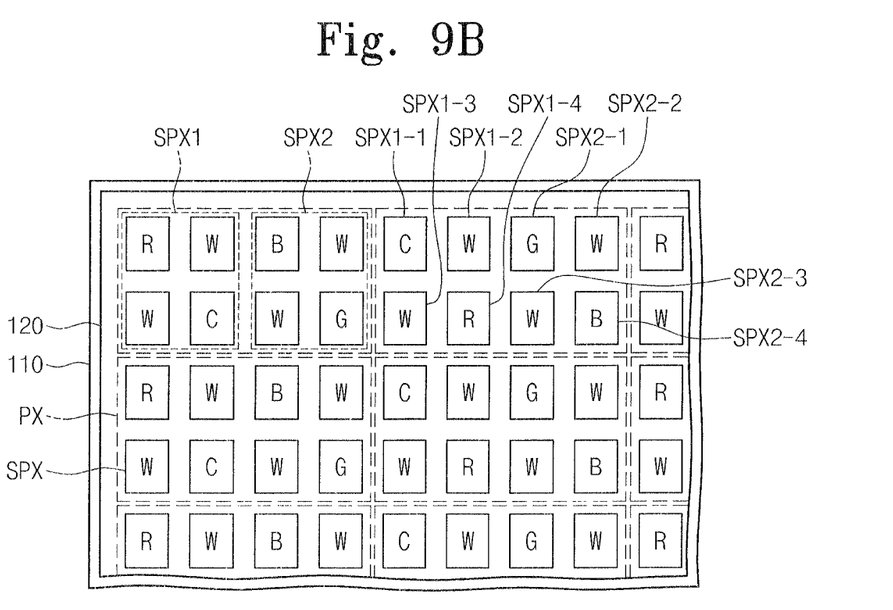
Figure 9C:
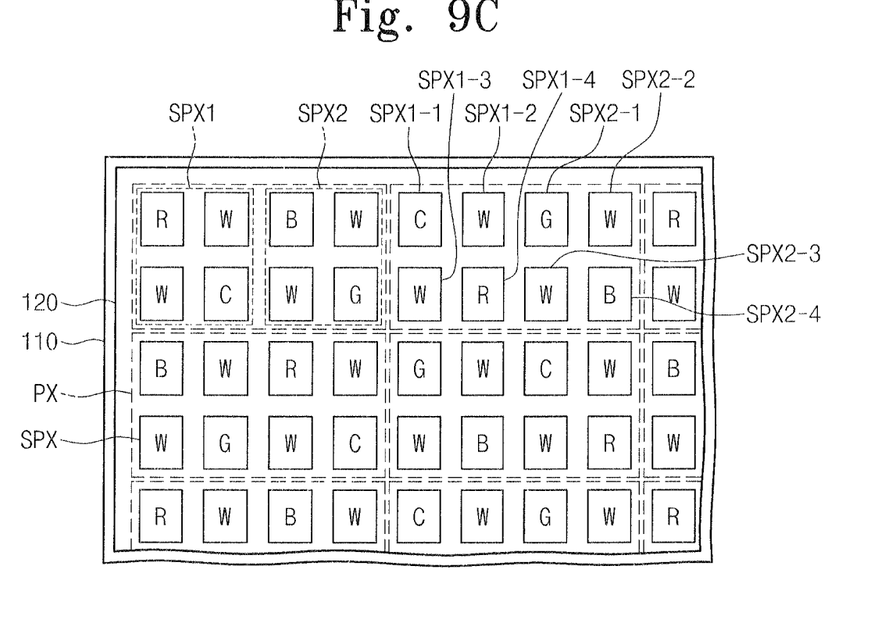
Figure 9D:
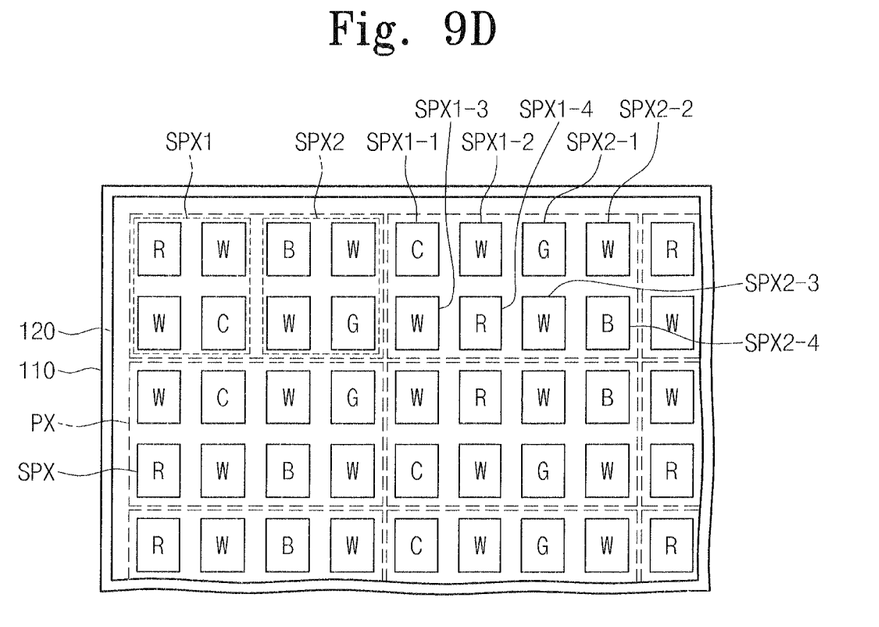
Figure 9E:
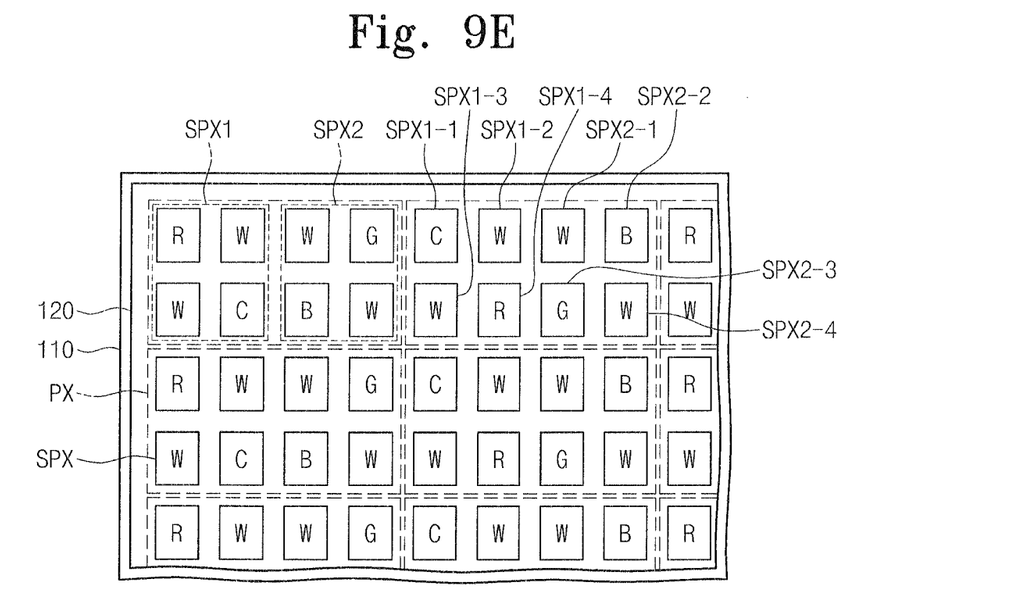
Figure 9F:
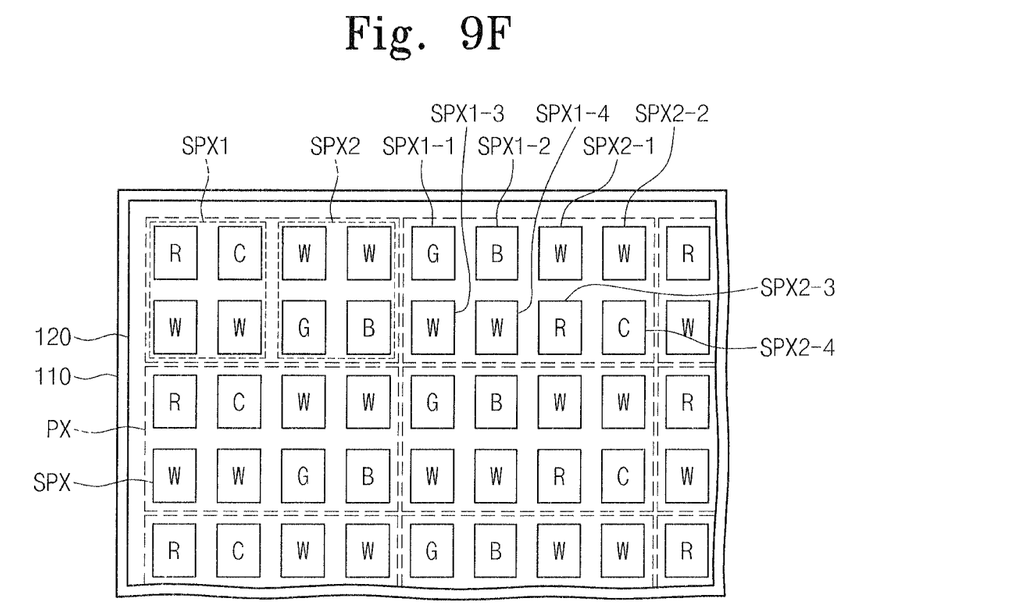
Figure 9G:
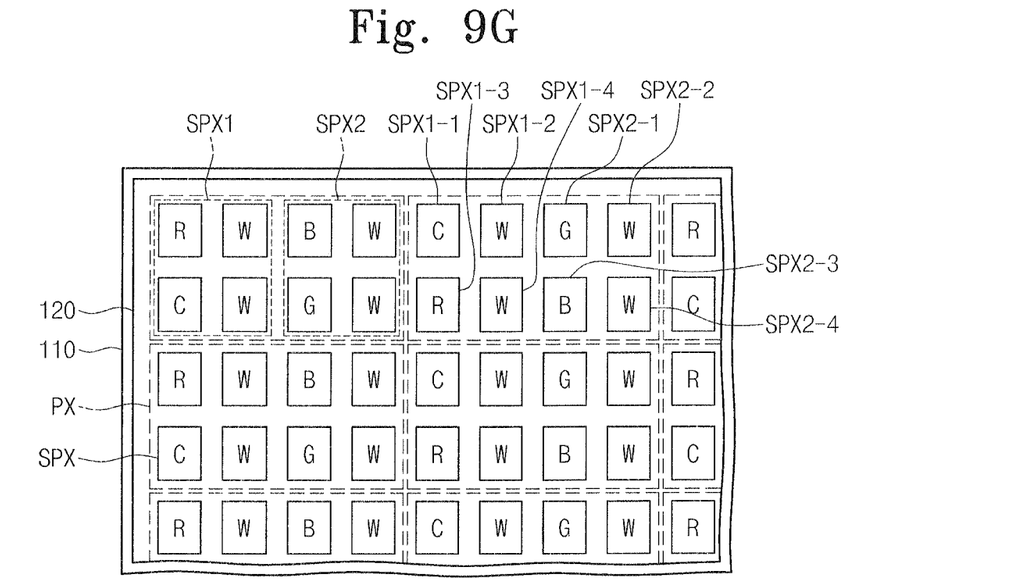

Different from the above-described arrangement, in the display panel DP shown in FIG. 9G, the two sub-pixels each including the white color filter W of the first sub-pixel group SPX1 are arranged in the same column, and the two sub-pixels each including the white color filter W of the second sub-pixel group SPX2 are arranged in the same column.

In the first sub-pixel group SPX' of each display panel DP shown in FIGS. 9A to 9E, the two sub-pixels each including the white color filter W are alternately arranged with the other two sub-pixels each not including the white color filter W.

In the second sub-pixel group SPX2 of each display panel DP shown in FIGS. 9A to 9E, the two sub-pixels each including the white color filter W are alternately arranged with the other two sub-pixels each not including the white color filter W.

In the display panel DP shown in FIG. 9A, the pixels PX arranged in a P-th row (P is a natural number equal to or smaller than N) among the pixels arranged in the matrix form of N rows by M columns may include the color filters CF arranged in the same way.

Referring to FIG. 9A, in each pixel PX arranged in a first row of the N rows, the first sub-pixel SPX1-1, the fourth sub-pixel SPX1-4, the fifth sub-pixel SPX2-1, and the eighth sub-pixel SPX2-4 may include the red color filter R, the cyan color filter C, the blue color filter B, and the green color filter G, respectively. In addition, in each pixel PX arranged in the first row of the N rows, the second sub-pixel SPX1-2, the third sub-pixel SPX1-3, the sixth sub-pixel SPX2-2, and the seventh sub-pixel SPX2-3 may include the white color filter W. However, the pixels PX arranged in different rows may include the color filters CF arranged in different ways. This is shown, for example, in the second row of the N rows in FIG. 9A.

In addition, as shown in FIG. 9B, the pixels PX arranged in a K-th column (K is a natural number equal to or smaller than M) among the pixels arranged in the matrix form of N rows by M columns may include the color filters CF arranged in the same way. However, the pixels PX arranged in different columns may include the color filters CF arranged in different ways. This is shown, for example, by the pixels PX in the left-hand side column of FIG. 9B and the pixels PX in the column adjacent to the left-hand side column in FIG. 9B.

As shown in FIGS. 9C and 9D, the pixels PX of adjacent columns and rows in the matrix form of N rows by M columns may each have a different arrangement of color filters CF.

According to the above described embodiments, the display apparatus includes eight sub-pixels SPX. The eight sub-pixels SPX include four white color filters W and four color filters R, G, B and C having different colors from each other.

In this case, two sub-pixels SPX of the sub-pixels arranged in the first row of the two row by four column array and two sub-pixels SPX of the sub-pixels arranged in the second row of the two row by four column array each include the white color filter W. Thus, the display apparatus may have improved brightness and color reproducibility.

In addition, the display apparatus includes the backlight assembly BLA including two or more light emitting devices BL-1-through BL-4 emitting colors different from each other. The sub-pixels SPX including the white color filter W display a predetermined color using the light emitted from the light emitting devices BL-1-through BL-4. Accordingly, the color reproducibility of an image may be improved.

Further, since the two sub-pixels SPX including the white color filter W among the sub-pixels arranged in the first row of the two row by four column array are applied with data voltages having polarities opposite to each other and the two sub-pixels SPX including the white color filter W among the sub-pixels arranged in the second row of the two row by four column array are applied with data voltages having polarities opposite to each other, the display quality of the display apparatus may be improved. In other words, flicker and crosstalk may be prevented from occurring in the sub-pixels SPX.

Figure 10A:
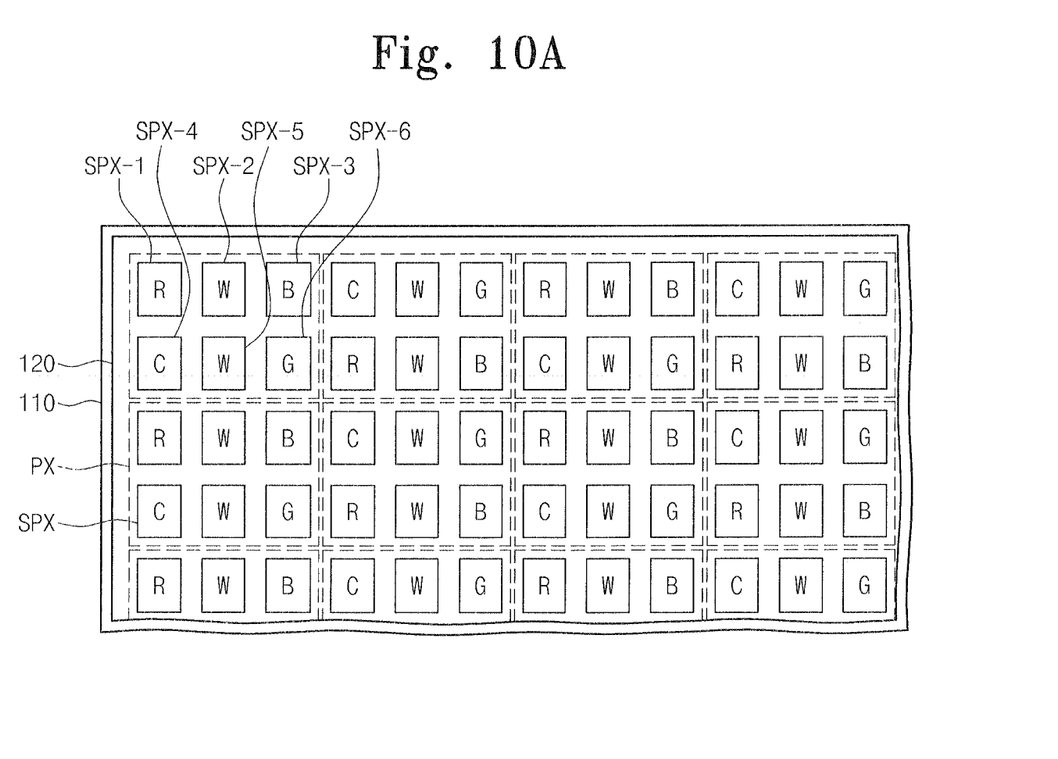
FIGS. 10A to 10C are plan views showing a display apparatus according to exemplary embodiments of the present invention.
Figure 10B:
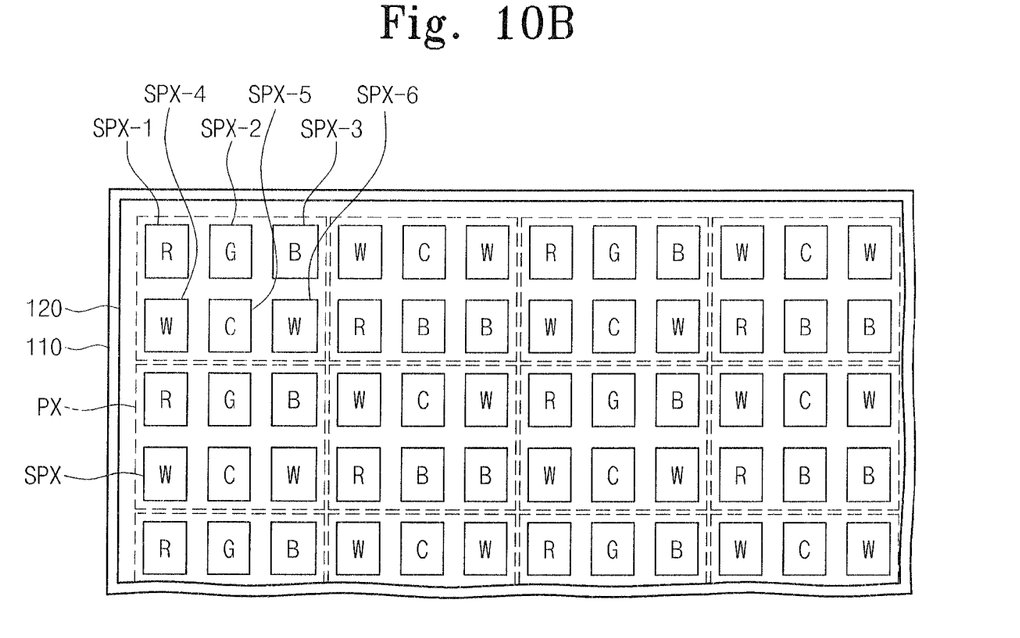
Figure 10C:
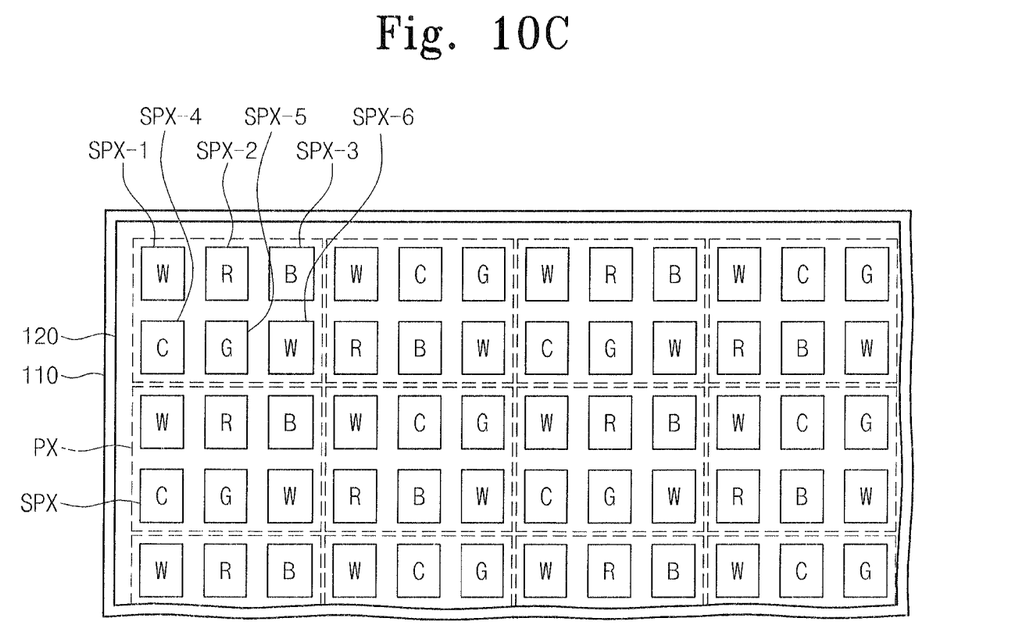

FIGS. 10A to 10C are plan views showing display apparatuses according to exemplary embodiments of the present invention.

In the display apparatuses each including the display panels DP shown in FIGS. 10A to 10C, the configuration of the sub-pixels SPX included in the pixels PX and the arrangement of the color filters CF of the sub-pixels SPX are different from those of the display apparatus described with reference to FIGS. 1 to 8. In addition, in the display apparatuses each including the display panels DP shown in FIGS. 10A to 10C, the signal controller SC (refer to FIG. 1) generates the image data Rd', Gd', Bd', Cd', W1, and W2 based on the red, green, and blue image data Rd, Gd, and Bd. The image data Rd', Gd', Bd', Cd', W1, and W2 include the red image data Rd', the green image data Gd', the blue image data Bd', the fourth color image data Cd', and two white image data W1 and W2.

The data driver DC (refer to FIG. 1) is connected to the data lines DL1 to DLm (refer to FIG. 1) of the display panel DP. The data driver DC receives the image data Rd', Gd', Bd', Cd', W1, and W2 and applies the data voltages to the data lines DL1 to DLm in response to a reference voltage Vref applied from the outside.

Hereinafter, the arrangements of the sub-pixels SPX and the color filters CF will be mainly described with reference to FIGS. 10A to 10C.

Each display panel DP shown in FIGS. 10A to 10C includes at least one pixel PX. The display panels DP may include a plurality of pixels PX arranged in the matrix form of N rows by M columns. In the present exemplary embodiment, each of N and M is a natural number equal to or larger than 2.

Each pixel PX includes six sub-pixels SPX arranged in a two row by three column array. Each of the sub-pixels SPX includes a pixel electrode PE and a color filter CF.

As shown in FIGS. 10A to 10C, each pixel PX includes two white color filters W and four color filters R, G, B, and C having different colors from each other. The six color filters CF respectively correspond to the six sub-pixels SPX.

Among the six sub-pixels SPX, the sub-pixel arranged in the first row and the first column of the array is referred to as a first sub-pixel SPX-1, the sub-pixel arranged in the first row and the second column of the array is referred to as a second sub-pixel SPX-2, and the sub-pixel arranged in the first row and the third column of the array is referred to as a third sub-pixel SPX-3. In addition, the sub-pixel arranged in the second row and the first column of the array is referred to as a fourth sub-pixel SPX-4, the sub-pixel arranged in the second row and the second column of the array is referred to as a fifth sub-pixel SPX-5, and the sub-pixel arranged in the second row and the third column of the array is referred to as a sixth sub-pixel SPX-6.

In the present exemplary embodiment, as shown in FIGS. 10A to 10C, the pixels PX arranged in a K-th column (K is an even number equal to or smaller than M) among the pixels arranged in the matrix form of N rows by M columns may include the color filters CF arranged in the same way.

Referring to FIG. 10A, among the pixels PX arranged in the second column, for instance the second column from the left-hand side of the display panel DP, the first sub-pixel SPX-1 includes the cyan color filter C, the second sub-pixel SPX-2 includes the white color filter W, and the third sub-pixel SPX-3 includes the green color filter G. In addition, the fourth sub-pixel SPX-4, the fifth sub-pixel SPX-5, and the sixth sub-pixel SPX-6 include the red color filter R, the white color filter W, and the blue color filter B, respectively. The rest of the pixels PX arranged in the second column may have this color filter CF arrangement.

In addition, the pixels PX arranged in a (K−1)th column among the pixels arranged in the matrix form of N rows by M columns may include the color filters CF arranged in the same way.

For instance, among the pixels PX arranged in the first column, for example, the first column from the left-hand side of the display panel DP, the first sub-pixel SPX-1 includes the red color filter R, the second sub-pixel SPX-2 includes the white color filter W, and the third sub-pixel SPX-3 includes the blue color filter B. In addition, the fourth sub-pixel SPX-4, the fifth sub-pixel SPX-5, and the sixth sub-pixel SPX-6 include the cyan color filter C, the white color filter W, and the green color filter B, respectively. The rest of the pixels PX arranged in the first column may have this color filter CF arrangement.

In addition, even though the display panels DP shown in FIGS. 10A to 10C satisfy the above-mentioned condition, that is, the pixels PX arranged in a column may include the color filters CF arranged in the same way; the arrangement of the color filters CF is different in each display panel DP.

As shown in FIG. 10A, the two sub-pixels SPX including the white color filter W may be arranged in the second column of the two row by three column array in the case of the pixels PX arranged in the K-th column and the (K−1)th column.

In addition, the color filters CF arranged in the first row of the two row by three column array of each of the pixels PX arranged in the (K−1)th column may have the same arrangement as the color filters CF arranged in the second row of the two row by three column array of each of the pixels PX arranged in the K-th column. In addition, the color filters CF arranged in the second row of the two row by three column array of each of the pixels PX arranged in the (K−1)th column may have the same arrangement as the color filters CF arranged in the first row of the two row by three column array of each of the pixels PX arranged in the K-th column.

As an example, the first sub-pixel SPX-1 and the third sub-pixel SPX-3 of each pixel PX arranged in the first column of the matrix form of N rows by M columns respectively include the red color filter R and the blue color filter B, and the fourth sub-pixel SPX-4 and the sixth sub-pixel SPX-6 of each pixel PX arranged in the second column of the matrix form of N rows by M columns respectively include the red color filter R and the blue color filter B. In addition, the fourth sub-pixel SPX-4 and the sixth sub-pixel SPX-6 of each pixel PX arranged in the first column of the matrix form of N rows by M columns include the cyan color filter C and the green color filter G respectively, and the first sub-pixel SPX-1 and the third sub-pixel SPX-3 of each pixel PX arranged in the second column of the matrix form of N rows by M columns include the cyan color filter C and the green color filter G, respectively.

Referring to FIG. 10B, one of the two sub-pixels SPX including the white color filter W is arranged in the first row and the first column of the two row by three column array and the other one of the two sub-pixels SPX including the white color filter W is arranged in the first row and the third column of the two row by three column array in each of the pixels PX arranged in the K-th column. In other words, the first sub-pixel SPX-1 and the third sub-pixel SPX-3 may include the white color filter W.

In FIG. 10B, the color filters CF arranged in the second row of the two row by three column array of each of the pixels PX arranged in the (K−1)th column may have the same arrangement as the color filters CF arranged in the first row of the two row by three column array of each of the pixels PX arranged in the K-th column.

In addition, the color filters CF arranged in the first row of the two row by three column array of each of the pixels PX arranged in the (K−1)th column may have the same arrangement as the color filters CF arranged in the second row of the two row by three column array of each of the pixels PX arranged in the K-th column.

For instance, the fourth sub-pixel SPX-4, the fifth sub-pixel SPX-5, and the sixth sub-pixel SPX-6 in each pixel PX arranged in the first column of the matrix form of N rows by M columns may respectively have the same white color filter W of the first sub-pixel SPX-1, the same cyan color filter C of the second sub-pixel SPX-2, and the same white color filter W of the third sub-pixel SPX-3 in each pixel PX arranged in the second column of the matrix form of N rows by M columns.

Referring to FIG. 10C, the color filter CF arranged in the first row and the second column of the two row by three column array and the color filter CF arranged in the first row and the third column of the two row by three column array in each pixel PX arranged in the (K−1)th column may be the same as the color filter CF arranged in the second row and the first column of the two row by three column array and the color filter CF arranged in the second row and the second column of the two row by three column array in each pixel PX arranged in the K-th column.

In addition, the color filters CF arranged in the second row and the first column of the two row by three column array and in the second row and the second column of the two row by three column array in each pixel PX arranged in the (K−1)th column may be respectively the same as the color filters CF arranged in the first row and the second column of the two row by three column array and in the first row and the third column of the two row by three column array in each pixel PX arranged in the K-th column.

As an example, the second sub-pixel SPX-2 and the third sub-pixel SPX-3 included in each pixel PX arranged in the first column of the matrix form of N rows by M columns include the red color filter R and the blue color filter B, respectively, and the fourth sub-pixel SPX-4 and the fifth sub-pixel SPX-5 included in each pixel PX arranged in the second column of the matrix form of N rows by M columns include the red color filter R and the blue color filter B, respectively. In addition, the fourth sub-pixel SPX-4 and the fifth sub-pixel SPX-5 included in each pixel PX arranged in the first column of the matrix form of N rows by M columns include the cyan color filter C and the green color filter G, respectively, and the second sub-pixel SPX-2 and the third sub-pixel SPX-3 included in each pixel PX arranged in the second column of the matrix form of N rows by M columns include the cyan color filter C and the green color filter G, respectively.

The display apparatus according to the above embodiment includes six sub-pixels SPX. The six sub-pixels SPX include two white color filters W and four color filters R, G, B, and C having different colors from each other. Thus, the display apparatus may have improved brightness and color reproducibility.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A display apparatus, comprising:
a backlight assembly emitting light;
a driving circuit part receiving an image signal, converting the image signal into image data, and generating a driving signal based on the image data; and
a display panel including at least one pixel in which a plurality of sub-pixels is arranged in a two row by four column array, wherein the display panel receives the light to display an image in response to the driving signal, wherein each of two sub-pixels of the sub-pixels arranged in a first row of the array comprises a white color filter and each of two sub-pixels of the sub-pixels arranged in a second row of the array comprises a white color filter,
wherein the image signal includes red, green and blue image signals, and when the image signal is converted to the image data, the image data includes red image data, green image data, blue image data, fourth color image data and four white image data, wherein the four white image data include brightness information equal to a smallest brightness level among brightness information of the red, green and blue image signals,
wherein the driving signal comprises data voltages to be applied to the sub-pixels, the two sub-pixels including the white color filters of the sub-pixels arranged in the first row are applied with the data voltages having polarities opposite to each other, and the two sub-pixels including the white color filters of the sub-pixels arranged in the second row are applied with the data voltages having polarities opposite to each other.

2. The display apparatus of claim 1, wherein four sub-pixels arranged in first and second columns of the array are a first sub-pixel group, four sub-pixels arranged in third and fourth columns of the array are a second sub-pixel group, two sub-pixels of the first sub-pixel group each comprise one of the white color filters, one of the remaining two sub-pixels of the first sub-pixel group comprises a color filter having a first color, the other one of the remaining two sub-pixels of the first sub-pixel group comprises a color filter having a second color different from the first color, two sub-pixels of the second sub-pixel group each comprise one the white color filters, one of the remaining two sub-pixels of the second sub-pixel group comprises a color filter having a third color different from the first and second colors, and the other one of the remaining two sub-pixels of the second sub-pixel group comprises a color filter having a fourth color different from the first, second, and third colors.

3. The display apparatus of claim 2, wherein the two sub-pixels including the white color filters of the first sub-pixel group are arranged in different columns from each other, and the two sub-pixels including the white color filters of the second sub-pixel group are arranged in different columns from each other.

4. The display apparatus of claim 3, wherein the remaining two sub-pixels of the first sub-pixel group are arranged in different columns from each other, and the remaining two sub-pixels of the second sub-pixel group are arranged in different columns from each other.

5. The display apparatus of claim 4, wherein, among the first sub-pixel group, the sub-pixel arranged in the first row and the first column is a first sub-pixel, the sub-pixel arranged in the first row and the second column is a second sub-pixel, the sub-pixel arranged in the second row and the first column is a third sub-pixel, and the sub-pixel arranged in the second row and the second column is a fourth sub-pixel, and among the second sub-pixel group, the sub-pixel arranged in the first row and the third column is a fifth sub-pixel, the sub-pixel arranged in the first row and the fourth column is a sixth sub-pixel, the sub-pixel arranged in the second row and the third column is a seventh sub-pixel, and the sub-pixel arranged in the second row and the fourth column is an eighth sub-pixel, and each of the second, third, sixth, and seventh sub-pixels comprises one of the white color filters.

6. The display apparatus of claim 2, wherein the pixel is provided in a plural number on the display panel and the pixels are arranged in an N row by M column array, wherein each of N and M is a natural number equal to or larger than 2.

7. The display apparatus of claim 6, wherein the pixels arranged in a P-th row among the pixels arranged in the N row by M column array have the same color filter arrangement, wherein P is a natural number equal to or smaller than N.

8. The display apparatus of claim 6, wherein the pixels arranged in a K-th column among the pixels arranged in the N row by M column array have the same color filter arrangement, where K is a natural number equal to or smaller than M.

9. The display apparatus of claim 1, wherein the backlight assembly comprises:
at least one light source including a first light emitting device emitting a red light, a second light emitting device emitting a green light, and a third light emitting device emitting a blue light; and
a light source controller receiving the image data and driving the first, second, and third light emitting devices according to brightness characteristics and color characteristics of the image data.

10. The display apparatus of claim 9, wherein the light source further comprises a fourth light emitting device emitting light having a color different from the red, green and blue lights of the first, second, and third light emitting devices, and the fourth light emitting device is driven in synchronization with at least one of the first, second, and third light emitting devices.

11. A display apparatus, comprising:
a driving circuit part receiving an image signal, converting the image signal into image data, and generating a driving signal based on the image data; and
a display panel including at least one pixel in which a plurality of sub-pixels is arranged in an array, wherein the display panel displays an image in response to the driving signal, wherein each of at least two of the sub-pixels comprises a white color filter and four of the sub-pixels comprise non-white color filters having different colors from each other,
wherein the image signal includes red, green and blue image signals, and when the image signal is converted to the image data, the image data includes red image data, green image data, blue image data, fourth color image data and four white image data, wherein the four white image data include brightness information equal to a smallest brightness level among brightness information of the red, green and blue image signals, wherein the driving signal comprises data voltages to be applied to the sub-pixels, two of the sub-pixels including the white color filters are arranged in a first row of the array and applied with the data voltages having polarities opposite to each other, and two of the sub-pixels including the white color filters are arranged in a second row of the array and applied with the data voltages having polarities opposite to each other.

* * * * *